United States Patent Office

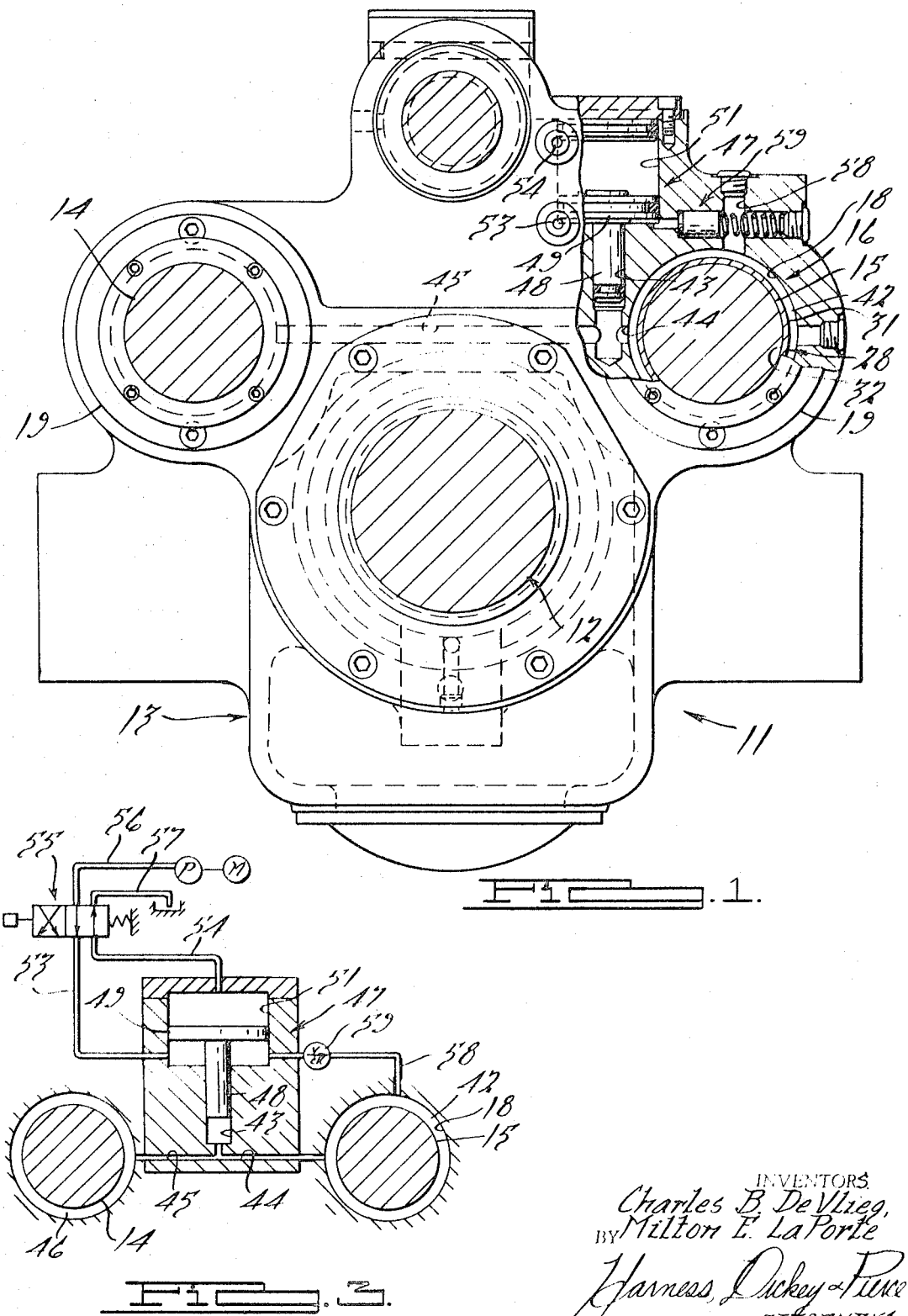

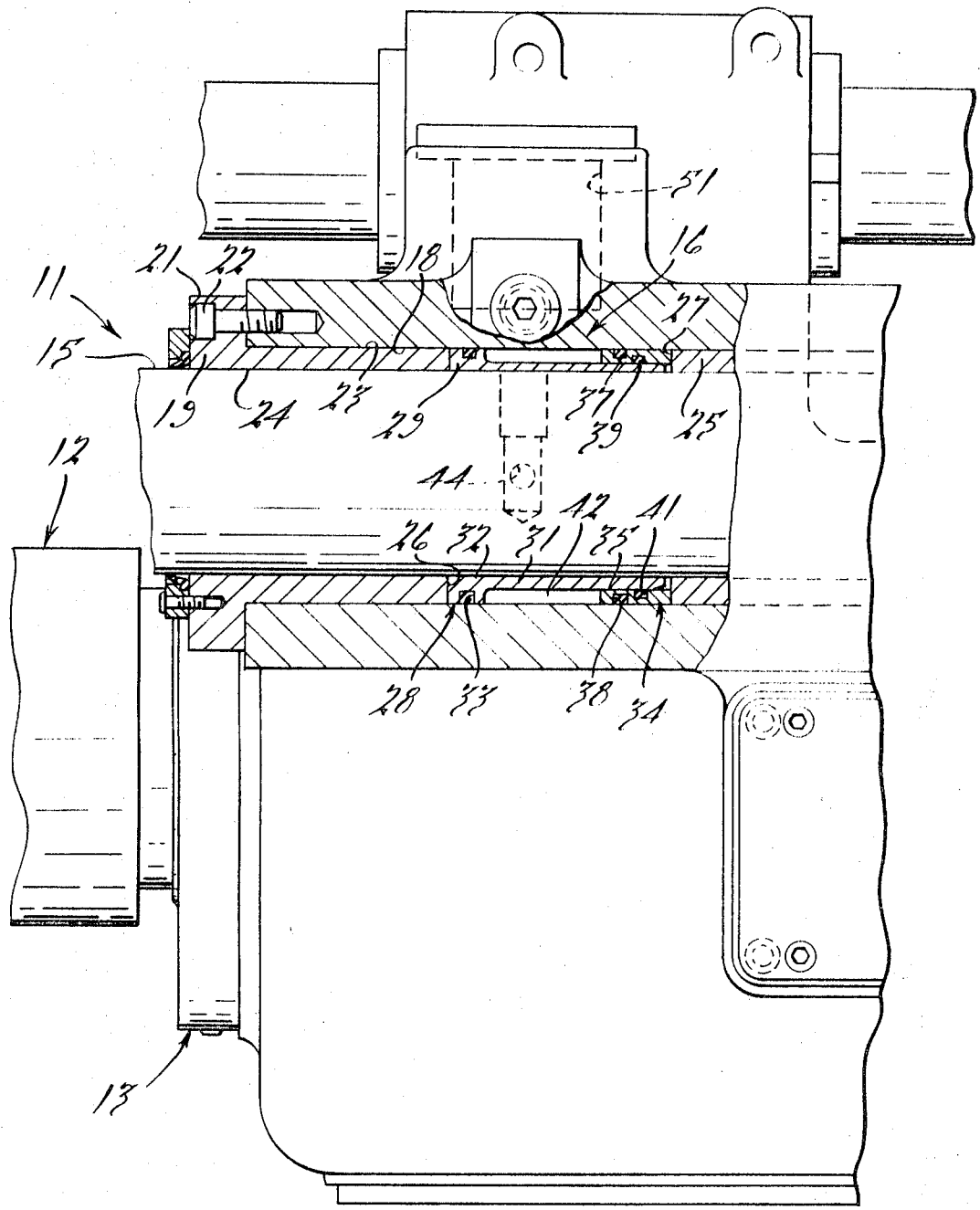

3,456,530
Patented July 22, 1969

3,456,530
CLAMPING MECHANISM
Charles B. De Vlieg, Bloomfield Hills, and Milton E. La Porte, Royal Oak, Mich., assignors to De Vlieg Machine Company, a corporation of Michigan
Filed June 19, 1967, Ser. No. 647,170
Int. Cl. B23b 47/00
U.S. Cl. 77—1    8 Claims

ABSTRACT OF THE DISCLOSURE

This application discloses a clamping mechanism for accurately locking a machine tool slide in a selected axial position with respect to a supporting assembly. The machine tool slide is supported for axial movement along a pair of spaced bars which form a portion of the supporting assembly. A hydraulic clamping mechanism is provided that acts between each of these bars and the slide for selectively locking the slide in an accurate axial location with respect to the bars. Each clamping mechanism consists of a first member that is supported within an annular recess of the slide and which has elongated deformable sleeve. The first member also has an annular end portion adapted to abuttingly engage one end of the recess in the slide. A second sealing member of annular shape is received on the outer end of the sleeve and is adapted to abuttingly engage the opposite wall of the recess. A hydraulic device is provided for selectively pressurizing the recess around the flexible sleeve and within the recess for driving the end portions into abutting engagement with the recess and for deflecting the sleeve portion into radial engagement with the adjacent supporting bar. This effectively locks the bar and slide against relative axial movement at an extremely accurate axial position.

BACKGROUND OF THE INVENTION

This invention relates to a clamping mechanism and more particularly to an improved hydraulic clamping mechanism for machine tools.

In nearly all machine tools, either the workpiece or the associated tool is supported for relative movement to accomplish the desired machining operation. In many instances, it is necessary to lock these elements in an accurately predetermined relative position for high precision machining. Various types of locking mechanisms such as hydraulic clamps have been proposed for this purpose. If a hydraulic clamp is used, it is essential that the parts be maintained in accurately fitted relationship to preclude leakage. It also is essential that the hydraulic clamp operate in such a way as to maintain accuracy in the retained position of the members. Previous structures proposed for this purpose have been expensive or have sacrificed one or more of the aforenoted functions.

It is, therefore, a principal object of this invention to provide an improved hydraulic clamping mechanism.

It is another object of this invention to provide an improved hydraulic clamping mechanism for maintaining two members of a machine tool in an accurate position with respect to each other.

It is a further object of this invention to provide an improved, low cost, hydraulic clamping mechanism for a machine tool.

SUMMARY OF THE INVENTION

This invention is particularly adapted for use in selectively retaining first and second members of a machine tool against relative movement and in an accurate relationship to each other. The clamping mechanism comprises a recess defined by one of the members contiguous to a surface of the other member. The recess is defined at least in part by spaced, oppositely facing walls. A first clamping member is positioned in the recess and has an end portion juxtaposed to one of the walls and adapted to abuttingly engage this wall. The first clamping member also has a cantilevered, deflectable portion extending from its end portion toward the other of the walls and juxtaposed to the surface of the other member. A second clamping member is supported for movement relative to the first clamping member within the recess. The second clamping member is juxtaposed to the other wall and is adapted to abuttingly engage the other wall. Means are provided for establishing a fluid seal between the second clamping member and the deflectable portion of the first clamping member. The first and second clamping members and the recess of the one member define a closed fluid chamber. Means are provided for selectively pressurizing the chamber for moving the end portion of the first clamping member and the second clamping member into abutting engagement with the respective walls of the recess and for deflecting the cantilevered portion of the first clamping member into clamping relationship with the adjacent surface of the other member.

BRIEF DESCRIPTION OF THE DRAWINGS

FIGURE 1 is an end elevational view of a machine tool slide embodying this invention with a portion of the structure broken away to more clearly show the details of the clamping mechanism.

FIGURE 2 is a side elevational view of the mechanism shown in FIGURE 1, with a portion broken away.

FIGURE 3 is a schematic view showing the hydraulic circuit of the clamping mechanism.

DESCRIPTION OF THE PREFERRED EMBODIMENT

In the drawings, the reference numeral 11 indicates a portion of a spindle head of a machine tool embodying this invention. The spindle head 11 may be used in connection with a boring bar or any other suitable type of machine tool. It is also to be understood that the described clamping mechanism may be used for clamping other types of bar supported slides or for accurately clamping other components against relative movement. The spindle head 11 includes a spindle 12 that is adapted to support a forming or cutting tool (not shown) and which spindle is supported for rotation within a housing, indicated generally by the reference numeral 13. A suitable drive mechanism (not shown) may be supported at least in part within the housing 13 for rotating the spindle 12. In addition, the housing 13 and associated spindle 12 are supported for longitudinal movement with respect to the associated machine tool upon a pair of axially extending supporting bars 14 and 15. The mechanism for rotating the spindle 12 and for feeding the associated tool to the workpiece may be of any known type, for example, that shown in the copending application of Charles B. De Vlieg and Richard A. Jerue, entitled "Machine Tool Spindle and Drive Mechanism and Control System Therefor," Ser. No. 602,075, filed Dec. 15, 1966, now Patent No. 3,406,796 and assigned to the assignee of this invention. Since this portion of the mechanism forms no part of the present invention, it will not be described in detail.

A clamping mechanism indicated generally by the reference numeral 16 is provided between the housing 13 and each of the supporting bars 14 and 15 for accurately locking the spindle 12 and the housing 13 in any selected axial position with respect to the associated machine tool. Only one of the clamping mechanisms 16 has been shown in detail, that associated with the supporting bar 15, since the mechanism associated with the bar 14 is identical to that illustrated and described in detail.

The housing 13 defines an axially extending bore 18 that is coaxial with the supporting bar 15 but which has a larger diameter than the outer diameter of the bar 15. A bearing member 19 having a headed portion 21 is affixed to the outer face of the housing 13 around the bore 18 by means of a plurality of socket headed bolts 22. The bearing member 19 has a sleeve portion 23 that extends into the bore 18 and defines a cylindrical bore 24 of substantially the same diameter as the bar 15 to slidably support the housing 13 upon the bar 15. A second bearing member 25 is fixed to the housing 13 within the bore 18 at a point spaced from an inner shoulder 26 of the bearing member 19. The bearing member 25 has a shoulder 27 that faces in an opposite direction to the shoulder 26 and which with the shoulder 26 and the bore 18 defines an annular cavity or recess around the bar 15 and adjacent its outer periphery.

A first clamping member, indicated generally by the reference numeral 28, is supported within this annular recess. The first clamping member 28 has an annular head portion 29 that is juxtaposed to the shoulder 26 and from which a cantilevered sleeve portion 31 extends. The head portion 29 and sleeve portion 31 define a cylindrical bore 32 that has a somewhat larger diameter than the bar 15 and which is annularly disposed around the bar 15. The clamping member 28 may be formed from any suitable material as long as the sleeve portion 31 has sufficient resilience to deflect under hydraulic pressure, as will become more apparent as this description proceeds. An O-ring seal 33 is received in annular groove formed in the head portion 29 and sealingly engages the adjacent portion of the housing 13 that defines the bore 18.

Adjacent the outer end of the sleeve portion 31 of the first clamping member 28, the second clamping member 34 is received in the aforenoted recess. The second clamping member 34 has an annular shape and defines a cylindrical bore 35 that is slidably supported upon the outer periphery of the sleeve 31. The second clamping member 34 is juxtaposed to the shoulder 27 and has an outer diameter that is substantially the same as the diameter of the bore 18. An O-ring seal 37 is received in a circumferential groove 38 formed in the outer periphery of the clamping member 34 to effect a seal with the housing 13. In a like manner, an O-ring seal 39 is received in a circumferential groove 41 formed on the inner periphery of the clamping member 34 to effect a fluid tight seal with the outer periphery of the sleeve portion 31. The clamping members 28 and 34, therefore, define an annular fluid tight cavity 42 with the housing bore 18.

Referring now specifically to FIGURES 1 and 3, the cavity 42 is connected to a cylinder bore 43 formed in the housing 13 by means of a transversely extending passage 44. A like passage 45 extends to a corresponding cavity 46 of the clamping mechanism associated with the bar 14. Means are provided for selectively pressurizing a fluid which is contained within the cavities 42 and 46, which means is indicated generally by the reference numeral 47. The pressure applying means 47 comprises a piston 48 that is supported within the cylinder bore 43. The piston 48 in integrally connected to a larger diameter piston 49 that is received in a larger diameter cylinder bore 51 adjacent to and coaxial with the cylinder bore 43 within the housing 13. A first fluid passage 53 extends into the cylinder bore 51 on the underside of the piston 49 and a second fluid passage 54 extends from the cylinder bore 51 on the opposite side of the piston 49. The fluid passages 53 and 54 extend to a two-way solenoid controlled valve, indicated generally by the reference numeral 55 that is adapted to selectively connect the passages 53 and 54 to a source of high pressure fluid introduced through a conduit 56 or to a sump conduit 57. A conduit 58 extends from the cavity 42 to the cylinder bore 51 on the lower side of the piston 49. A check valve indicated generally by the reference numeral 59, is positioned in the conduit 58. The cavity 46 is also connected to the conduit 58 through the passages 45, 44 and cavity 42.

OPERATION

In operation the fluid pressure in the chambers 42 and 46 is reduced sufficiently so that the sleeve portions 31 of the clamping members 28 will not be deflected. When the pressure is so relieved, the spindle 12 and housing 13 may move freely in an axial direction along the supporting bars 14 and 15. When it is desired to clamp the spindle 12 and housing 13 in a given axial position, the solenoid valve 55 is operated so as to expose the conduit 54 to the high pressure line 56 and the conduit 53 to the sump line 57. The hydraulic pressure, will, therefore, urge the piston 49 and associated piston 48 downwardly. As the piston 49 moves downwardly, there will be a pressure amplification within the cylinder bore 43 below the piston 48 due to its smaller diameter than the piston 49. Hydraulic fluid will, therefore, be forced to the annular cavities 42 and 46 through the fluid passages 44 and 45, respectively. The check valve 59 will be maintained in a closed position during this downward movement since the pressure in conduit 58 is higher than the pressure in the cylinder bore 51 on the lower side of the piston 49.

The increased pressure in the chambers 42 and 46 causes the clamping members 28 and 34 to move axially away from each other into abutting engagement with the respective shoulders 26 and 27. The abutting engagement of the clamping members 28 and 34 with the respective shoulders 26 and 27 accurately fixes the axial location of these elements and particularly the clamping member 28 with respect to the housing 13. In addition, the pressure in the chamber 42 causes the cantilevered sleeve portion 31 to deflect in a radial direction and engage the outer surface of the bar 15. The force thus exerted on the respective bars 14 and 15 is sufficient to hold the housing 13 and associated spindle 12 against axial movement. The engagement between the clamping member 28 and the bar 15 and shoulder 26 accurately clamps the members together both axially and radially. This clamping is, of course, also effected simultaneously.

When it is desired to release the clamping assemblies 16, the solenoid valve 55 is actuated to pressurize the conduit 53 and vent the conduit 54 and portion of the cylinder bore 51 above the piston 49 to sump. This will cause an upward pressure upon the piston 49 to relieve the pressure in the cylinder bore 43 and conduits 44 and 45. The check valve 59 can open at this time if the pressure in the portion of the cylinder bore 51 below the piston 49 is greater than the pressure in the conduit 58. This will insure that the cavities 42 and 46 are filled with a hydraulic fluid but there will not be enough pressure to cause deflection of the sleeve 31. The clamping devices 16 will, therefore, be released.

While is is preferred that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In combination with first and second members supported for relative movement, clamping means for selectively retaining said members against relative movement and in an accurate relationship to each other, said clamping means comprising a recess defined by one of said members contiguous to a surface of the other of said members, said recess being defined at least in part by oppositely facing spaced walls, a first clamping member having an end portion juxtaposed to one of said walls and adapted to abuttingly engage said one wall, said first clamping member further having a cantilevered deflectable portion extending from said end portion toward the other of said walls, said deflectable portion being juxtaposed to said surface of said other member, a second clamping member supported for movement relative to said first clamping member, said second clamping member being juxtaposed to said other wall and adapted to abuttingly engage said other wall, means for establishing a fluid seal between said second clamping member and said deflectable portion of said first clamping member, said first and second clamping members and said recess defining a closed fluid chamber, and means for selectively pressurizing said chamber for urging said clamping members into abutting engagement with the respective of said walls and for deflecting said deflectable portion of said first clamping member into clamping engagement with said surface of said other member for accurately fixing said members against movement with respect to each other.

2. The combination of claim 1 wherein the walls are spaced apart in the direction of relative movement between the members.

3. The combination of claim 1 wherein the second clamping member is supported for sliding movement upon the deflectable portion of the first clamping member.

4. The combination of claim 1 wherein the surface of the other member is a cylindrical surface, the recess is annular and the first and second clamping members are annular.

5. The combination of claim 4 wherein the second clamping member is supported for sliding movement upon the deflectable portion of the first clamping member.

6. A machine tool or the like comprising a slide member, a supporting bar, means slidably supporting said slide member upon said supporting bar, and clamping means for selectively retaining said slide member in a fixed axial positon upon said supporting bar, said clamping means comprising means defining an annular recess in said slide member around said supporting bar, said recess being defined at least in part by oppositely facing annular shoulders, a first clamping member having an annular end portion juxtaposed to one of said shoulders and adapted to abuttingly engage said one shoulder, said first clamping member further having a deflectable sleeve extending from said annular end portion toward the other of said shoulders, said sleeve portion being juxtaposed to the outer periphery of said supporting bar, a second annular clamping member supported for axial movement upon said sleeve portion and juxtaposed to said other shoulder and adapted to abuttingly engage said other shoulder, said first and said second clamping member and said recess defining a closed fluid chamber and means for selectively pressurizing said chamber for urging said clamping members axially away from each other into abutting engagement with the respective of said shoulders and for deflecting said sleeve portion into clamping engagement with said supporting bar for effecting accurate radial and axial clamping of said slide member to said supporting bar.

7. A machine tool or the like as set forth in claim 6 wherein the means for selectively pressurizing the chamber comprises a fluid operated piston supported for reciprocation within a cylinder bore defined by the slide, fluid passage means interconnecting said cylinder bore with said chamber and means for selectively reciprocating said piston.

8. A machine tool or the like as set forth in claim 6 wherein the slide member comprises a housing and further including a spindle supported for rotation by said housing.

References Cited

UNITED STATES PATENTS

| 3,244,028 | 4/1966 | Dever et al. | 90—11 XR |
| 2,957,393 | 10/1960 | Kampmeier | 90—11 |
| 2,947,061 | 8/1960 | Carlsen et al. | 29—1.5 |
| 3,103,144 | 9/1963 | Walter | 90—11 |

FRANCIS S. HUSAR, Primary Examiner

U.S. Cl. X.R.

19—1.5; 90—11